UNITED STATES PATENT OFFICE.

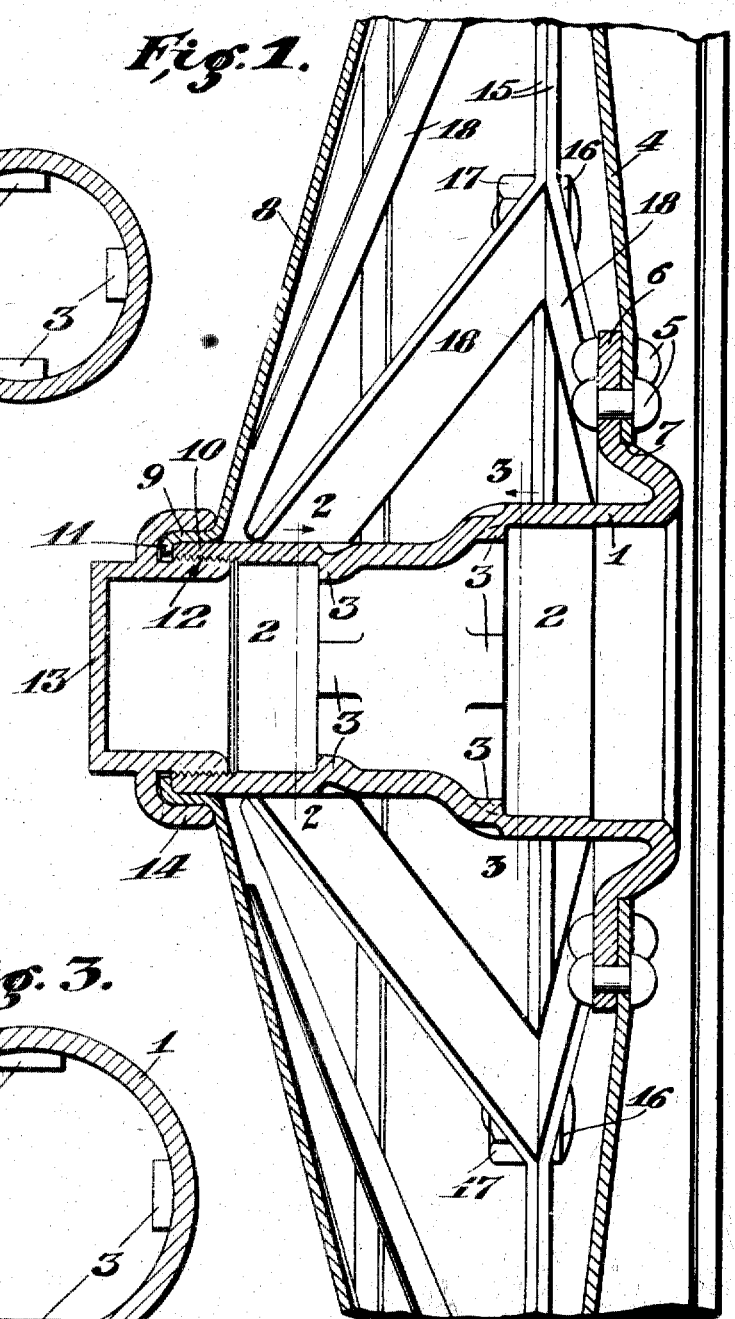
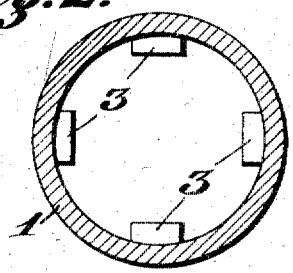

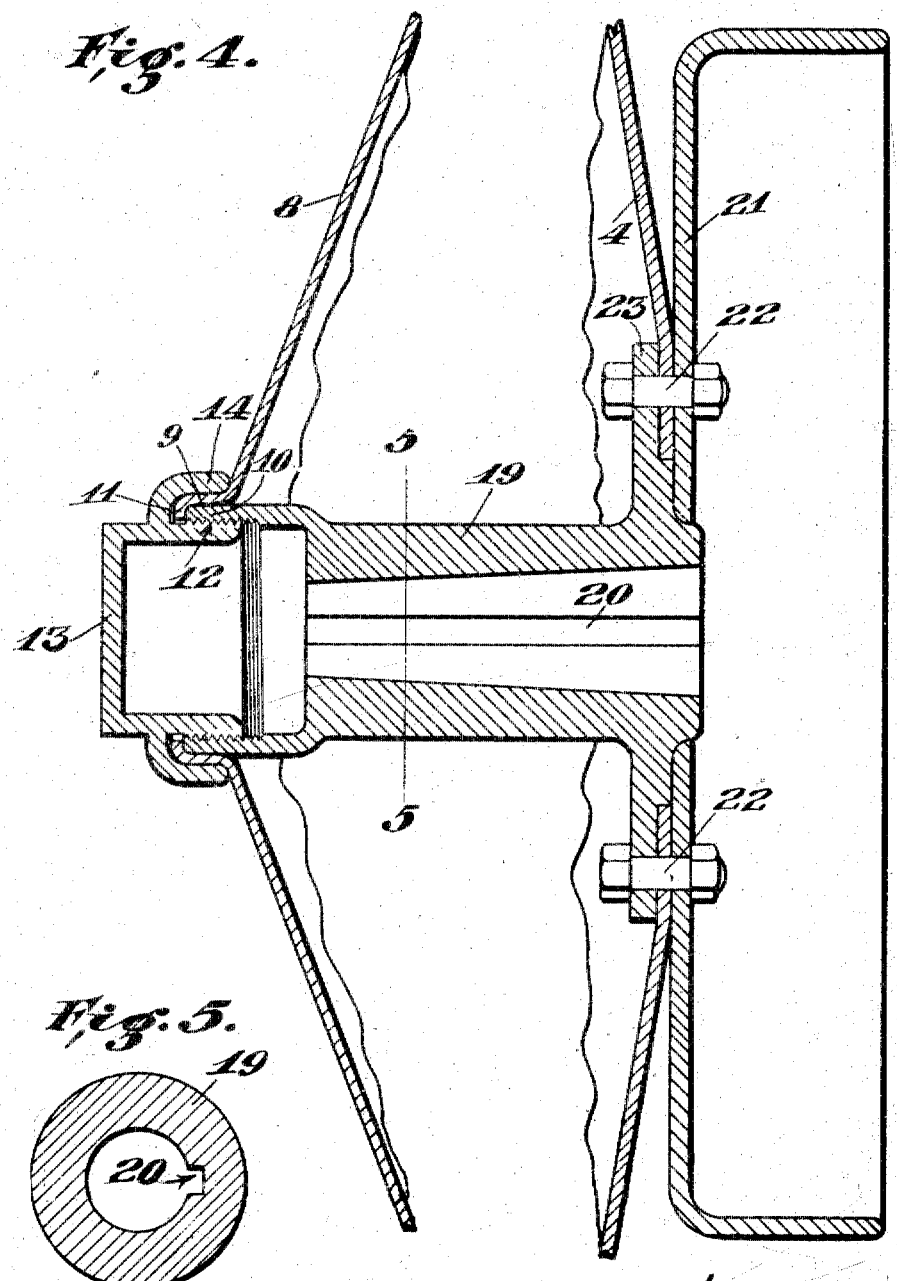

OLIVER G. SIMMONS, OF SAN ANTONIO, TEXAS, ASSIGNOR TO SIMMONS WHEEL COMPANY, OF SAN ANTONIO, TEXAS, A CORPORATION OF TEXAS.

PRESSED-METAL WHEEL.

1,282,306.  Specification of Letters Patent.  Patented Oct. 22, 1918.

Application filed June 12, 1916. Serial No. 103,114.

*To all whom it may concern:*

Be it known that I, OLIVER G. SIMMONS, a citizen of the United States, residing in San Antonio, in the county of Bexar and State of Texas, have invented new and useful Improvements in Pressed-Metal Wheels, of which the following is a specification.

This invention relates to certain new and useful improvements in pressed metal wheels of the general type illustrated in my Patent No. 1,179,768, dated April 18th, 1916. The general object of the present invention is to provide a suspension metal wheel of the type referred to, but differing from my patented wheel in that the present wheel is constructed to afford only a tire-demounting feature, the demountable outer hub of my prior construction being eliminated, and the wheel as a whole not being removable.

The present wheel has been designed to meet the wants of owners or manufacturers of light cars having relatively small wheel and tire diameters. In the use of my patented wheel it is assumed that the car owner will carry a spare wheel with an inflated tire thereon, which wheel can easily be placed on the car in case of tire trouble. This, however, means an investment of an extra wheel and tire to the car owner. While many prefer this to the trouble incident to inflating a tire, there are also many drivers of small cars who are not inclined to incur the expense of carrying an additional spare wheel and tire. In these latter cases repairs are usually made on the road, and to meet the demand of this class of users, I have modified the structure of my patented wheel to meet the condition only of quickly detaching the tire. In this construction, the outer hub member of my prior construction being eliminated, I am able to produce a much lighter and more economical wheel.

Aside from the above-stated general object of the invention, there are detailed objects relating to structural features which will more clearly appear hereinafter.

Referring to the accompanying drawings,—

Figure 1 is a fragmentary vertical sectional view of the front wheel;

Fig. 2 is a section on the line 2—2 of Fig. 1;

Fig. 3 is a section on the line 3—3 of Fig. 1;

Fig. 4 is a fragmentary vertical sectional view of the rear wheel; and

Fig. 5 is a sectional view on the line 5—5 of Fig. 4.

Referring now to the drawings, the numeral 1 indicates the hub of a front wheel which is provided with housings 2 for ball or roller bearings, and with indentations providing shoulders 3 against which said ball or roller bearings bear. The numeral 4 indicates the inner wheel section, which is secured by rivets 5, or by welding, or in any other preferred manner, to a flange 6 provided at the inner end of the hub 1, said inner wheel section being shouldered on said flange, as indicated at 7. The numeral 8 indicates the outer wheel section, which is provided at its center with an outwardly projecting substantially tubular or cylindrical hub end or neck 9 engaging over the outer end portion 10 of the hub 1, and with an inturned annular flange 11 which is adapted to extend over and abut against the end of the hub. This neck insures that the forces in the outer wheel section will be substantially supported at the hub, and also facilitates the securing of the outer wheel section as will presently appear. The end face portion 10 of the hub is interiorly screw-threaded, as indicated at 12, and is adapted to receive a corresponding exteriorly-threaded nut 13, which is provided on its outer side with an annular flange 14 which is adapted to engage over the cylindrical portion or hub end 9 of the outer wheel section and hold it in firm engagement with the end portion 10 of the hub 1. This forms a secure means of fastening the outer wheel section, and at the same time one which permits the ready removal of said wheel section. The two wheel sections 4 and 8 peripherally converge, and at their peripheral portions have flat engaging members 15, one of which carries a series of bolts 16 which pass through apertures in the other and receive nuts 17. Each section, of course, is provided with integral spokes 18. In order to remove the tire for the purpose of substituting a new tire or for repairs, it is only necessary to unscrew the nut 13 and the nuts 17, when the outer wheel section can be taken off, permitting the tire to be removed.

Referring to Fig. 4, my improved wheel is shown mounted on a hub 19 having the usual groove 20. This hub is adapted for mounting on the rear axle, and as usual has secured thereto a brake-drum 21 by means of bolts 22. These bolts likewise secure the inner wheel section 4 to the hub, the latter being interposed between a flange 23 on the hub and the side of the brake-drum. The construction at the front of the hub is the same as previously described. As indicated above, I preserve in this construction the suspension feature of my prior wheel, and the resiliency resulting from the unloaded bottom spokes is so great as to be noticeable even in a very short ride.

I claim:

1. In a wheel of the class described, in combination with a hub having its outer end portion interiorly screw-threaded, an inner wheel section secured to the inner end of the hub, an outer wheel section having peripheral and detachable engagement with said inner wheel section, and having a central substantially tubular outwardly projecting hub-member surrounding the screw-threaded end portion of said hub and provided with an integral annular flange abutting against the end face of said hub, and an exteriorly-threaded nut for engaging the threads of said hub for holding said flange against the end face of said hub.

2. In a wheel of the class described, in combination with a hub having an outer interiorly screw-threaded end, a wheel portion comprising two integral peripherally-converging wheel sections, the inner one of said wheel sections being secured to the inner end of said hub, the outer wheel section having a central substantially tubular outwardly projecting hub member surrounding the outer end portion of said hub and having an annular flange extending over and adapted to abut against the end of said hub, a nut screw-threaded to engage in the end face of said hub and having an annular flange adapted to surround and embrace the hub member of said outer wheel section, and means for effecting detachable peripheral engagement of said outer and inner wheel members.

3. In a wheel of the class described, in combination with a hub having its outer end portion interiorly screw-threaded, an inner wheel section secured to the inner end of the hub, an outer wheel section having peripheral and detachable engagement with said inner wheel section, and having a central substantially tubular outwardly projecting hub member surrounding the screw-threaded end portion of said hub and provided with an integral annular flange abutting against the end of said hub, an exteriorly-threaded nut for engaging in said hub, and a flange on said nut adapted to embrace and engage the hub member of said outer wheel section.

In testimony whereof, I have hereunto set my hand.

OLIVER G. SIMMONS